United States Patent [19]

Suga et al.

[11] Patent Number: 5,184,148
[45] Date of Patent: Feb. 2, 1993

[54] INK JET RECORDING HAVING AN INK WITH CARBON BLACK

[75] Inventors: Yuko Suga, Tokyo; Masako Shimomura, Yokohama, both of Japan

[73] Assignee: Canon Kabushiki Kaisha, Tokyo, Japan

[21] Appl. No.: 598,378

[22] Filed: Oct. 16, 1990

[30] Foreign Application Priority Data

Oct. 19, 1989 [JP] Japan ................ 1-273044
Aug. 31, 1990 [JP] Japan ................ 2-230271

[51] Int. Cl.$^5$ .................. B41J 2/05; C09D 11/02
[52] U.S. Cl. .................. 346/1.1; 106/20 R; 346/140 R
[58] Field of Search ............... 346/140, 1.1; 106/20-23; 260/DIG. 38

[56] References Cited

U.S. PATENT DOCUMENTS

| | | | |
|---|---|---|---|
| 3,687,887 | 8/1972 | Zabiak . | |
| 4,105,464 | 8/1978 | Osswald | 524/489 X |
| 4,306,245 | 12/1981 | Kasugayama | 346/140 |
| 4,429,320 | 1/1984 | Hattori | 346/140 |
| 4,460,727 | 7/1984 | Shoji | 524/215 |
| 4,530,961 | 7/1985 | Nguyen | 260/DIG. 38 X |
| 4,597,794 | 7/1986 | Ohta et al. | 106/20 |
| 4,803,119 | 2/1989 | Duff | 428/474.4 X |
| 4,959,661 | 9/1990 | Buxton | 346/1.1 |
| 5,010,125 | 4/1991 | Kruse | 260/DIG. 38 X |
| 5,026,427 | 6/1991 | Mitchell | 106/23 |
| 5,039,339 | 8/1991 | Phan | 428/481 |

FOREIGN PATENT DOCUMENTS

| | | |
|---|---|---|
| 2100449 | 3/1972 | France . |
| 58-80368 | 5/1983 | Japan . |
| 61-272278 | 12/1986 | Japan . |
| 62-568 | 1/1987 | Japan . |
| 62-101671 | 5/1987 | Japan . |
| 62-101672 | 5/1987 | Japan . |
| 64-6074 | 1/1989 | Japan . |
| 64-31881 | 2/1989 | Japan . |

OTHER PUBLICATIONS

Patent Abstracts of Japan, vol. 13, 221, (C-598) [3569], May 23, 1989.

Primary Examiner—Joseph W. Hartary
Attorney, Agent, or Firm—Fitzpatrick, Cella, Harper & Scinto

[57] ABSTRACT

An ink comprising an aqueous liquid medium which contains acid carbon black having a volatile content within the range of 3.5 to 8% by weight and a water-soluble resin having a weight average molecular weight within the range of 3,000 to 30,000, wherein the weight ratio of the acid carbon black to the water-soluble resin is within the range of 3:1 to 10:1. The present invention also relates to an ink jet recording method, and ink jet device, an ink cartridge and an ink jet recording apparatus which uses the ink.

31 Claims, 3 Drawing Sheets

INK JET RECORDING HAVING AN INK WITH CARBON BLACK

BACKGROUND OF THE INVENTION

1. Field of the Invention

The present invention relates to pigment ink which permits printing with an increased density and an ink jet recording method, an ink cartridge, ink jet device and ink jet recording apparatus which is capable of recording by discharging the ink droplets from the orifices of a recording head with the aid of the function of heat energy.

2. Related Background Art

An ink jet recording method has several advantages in that the method produces low noise and can obtain a high-resolution recorded image at a high speed by utilizing a highly integrated head.

Such an ink jet recording method uses as ink a solution obtained by dissolving one of various water-soluble dyes in water or a solvent mixture of water and an organic solvent. Because the water-soluble dye exhibits poor light resistance, when such a water-soluble dye is used, the light resistance of the recorded image frequently becomes a problem. In addition, because the ink is soluble in water, the water resistance of the recorded image also frequently becomes a problem. Namely, when rain, sweat or drinking water is applied to the recorded image, the recorded image is blurred with the ink or even disappears in some cases.

On the other hand, because writing utensils such as ball point pens, which use dyes, encounter the same problem, various kinds of aqueous pigment ink for writing utensils have been proposed for resolving the problems with respect to light resistance and water resistance.

Examples of studies, which investigated dispersion stability, prevention against solidification of ink at the end of a pen, and prevention against abrasion of the ball of a ball point pen, include those disclosed in Japanese Patent Laid-Open Nos. 58-80368, 61-272278, 62-568, 62-101671 and 62-101672. Ball point pens and markers, which use aqueous pigment ink, have recently been brought to the market.

Japanese Patent Laid-Open Nos. 64-6074 and 64-31881 disclose aqueous pigment ink at a pH of 5.0 or less which uses carbon black.

When conventional aqueous pigment ink for writing utensils is used in an ink jet recording device of the type in which recording is made by discharging an ink from the orifices of a recording head as a stream of ink droplets, however, there is a problem in that the discharging stability is significantly deteriorated, and printing failure occurs.

Particularly, when the conventional pigment ink is used in an ink jet recording device of the type in which ink droplets are discharged by applying heat energy to the ink, deposits are produced on a thin film resistor (heater) due to the heat pulse applied to the ink, thereby causing incomplete foaming of the ink and thus the occurrence of a disturbance resulting in non-uniform discharging. Even when no deposit is produced on the thin film resistor (heater), incomplete foaming still may occur and inhibits discharging of the droplets in response to the pulse applied to the ink and thus causes non-discharging.

Namely, in order to stably discharge the ink from the end of an orifice, the ink must have the ability to foam with a desired volume on the thin film resistor and repeat foaming and defoaming within a desired time. Because the conventional ink for writing utensils does not have such an ability, the ink produces the above-described problems when being charged in an ink jet recording device and used for recording.

Further, when a pigment ink, which has been previously proposed and which uses carbon black, is used in ink jet recording, although the fastness of the image printed on plain paper is significantly improved, as compared with that of the image printed by using dye ink, later research reveals that there is a disadvantage in that the density of the printed image, which is a characteristic of ink jet recording, is inferior to that of the image printed by using dye ink. If the pigment concentration is increased to improve the printing density, there is a default in that the discharging stability significantly deteriorated.

Because printing ink can be used at an extremely high concentration, as compared with the ink used in an ink jet recording device in the present invention, the printing density can be easily increased. The density can be also increased by increasing the thickness of the coated ink layer. However, in ink jet recording, particularly, high-density recording, because the size of the orifice is very small, the amount of the ink discharged is limited. In addition, as described above, an increase in the concentration of the pigment contained in the ink causes the occurrence of undesirable troubles in that precipitates during long-term preservation so that the ink solidifies due to drying at the end of the orifice, and non-discharging thus occurs. Furthermore, although some of the conventional aqueous pigment inks have excellent discharging properties for a relatively short time, the conventional pigment ink has a problem in that the ink is unstably discharged and finally not discharged when the driving conditions of the recording head are changed or when the ink is continuously discharged for a long time.

SUMMARY OF THE INVENTION

Accordingly, it is an object of the present invention to solve the above-described problems of prior art and provide ink which permits the printing of an image with both superior fastness and high density.

It is another object of the present invention to provide an ink which has excellent long-term preservation stability, which permits printing with high density and which can constantly stably be discharged even if driving conditions vary or if the ink has been used for a long period of time even under high temperature, and provide an ink jet recording method, an ink jet cartridge and an ink jet recording device which uses this ink.

In order to achieve the above objects, the present invention provides an ink which comprises an aqueous liquid medium containing acid carbon black having a volatile content within the range of 3.5 to 8% by weight of the total weight of the acid carbon black and a water-soluble resin having a weight average molecular weight within the range of 3,000 to 30,000, wherein the weight ratio of the acid carbon black to the water soluble resin is within the range of 3:1 to 10:1.

The present invention also provides an ink comprising an aqueous liquid medium which contains acid carbon black having a volatile content within the range of 3.5 to 8% by weight of the total weight of the acid carbon black and a water-soluble resin having a weight average molecular weight within the range of 3,000 to 30,000, wherein the weight ratio of the acid carbon black to the water soluble resin is within the range of 3:1 to 10:1, and the water-soluble resin dissolved in the medium being 2% by weight or less.

The present invention further provides an ink jet recording method in which ink is discharged as droplets from orifices by applying heat energy to the ink in accordance with a recording signal; the ink comprises an aqueous liquid medium containing acid carbon black having a volatile content within the range of 3.5 to 8% by weight of the total weight of the acid carbon black and a water-soluble resin having a weight average molecular weight of 3,000 to 30,000, the weight ratio of the acid carbon black to the water soluble resin is within the range of 3:1 to 10:1.

DETAILED DESCRIPTION OF THE PREFERRED EMBODIMENTS

Figure 1A:
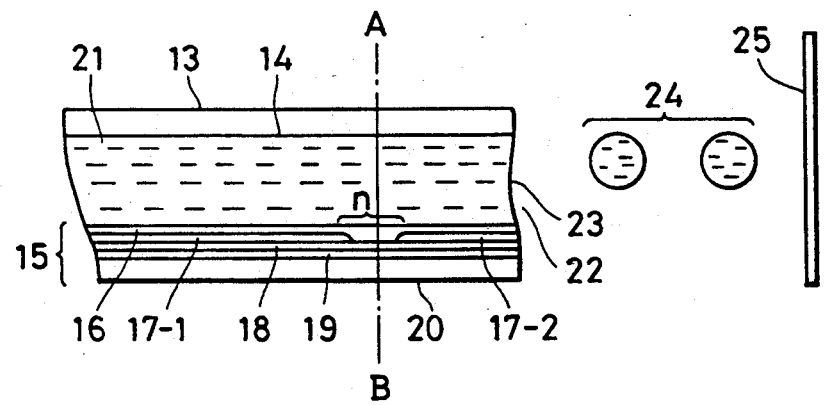
FIGS. 1(a) and 1(b) are respectively a longitudinal sectional view and a cross-sectional view of the head part of an ink jet recording device.

The inventors energetically investigated a method of increasing the density of a print obtained on a plain paper by ink jet recording using an aqueous pigment ink containing carbon black and a method of improving the dispersion stability of the ink. As a result, the inventor found that an ink, which can produce a print with a high density and which has good dispersion stability, can be produced under the following conditions:

1) carbon black containing 3.5 to 8% by weight of volatile matter is used; and 2) the weight average molecular weight of the water-soluble resin contained as a dispersant for the carbon black is within the range of 3,000 to 30,000. This finding led to the achievement of the present invention.

In the present invention, acid carbon black represents carbon black having acid groups on the particle surfaces thereof. It is preferable to use carbon black having a pH of 5 or less which has a volatile content within the range of 3.5 to 8% by weight of the total weight of the acid carbon black.

Namely, if an ink according to the present invention is prepared for printing by using carbon black having a pH of 5 or less, the density of the print obtained is equivalent to or higher than that of the print obtained by using dye ink.

The cause for the increase in density of the print, obtained by ink jet recording using the ink containing the carbon black having a pH of 5 or less, is not yet known. However, it is postulated that, because the affinity of the pigment particles for the ink solvent is increased due to the presence of many acid groups on the particle surfaces of carbon black, which also influence the pH, micro-dispersion is made possible, and the print density is consequently increased.

The value of pH of the carbon black used in the present invention is obtained by the measurement method below.

1 to 10 g of carbon black sample is weighed and placed in a beaker, and water is then added to the sample in an amount of 10 ml per gram of sample. The beaker is then covered with a watch glass, followed by boiling for 15 minutes. (Several drops of ethanol may be added to the sample in order to improve the wettability of the sample.) After the sample has been cooled to room temperature after boiling, the supernatant is removed by decantation or centrifugal separation, leaving a muddy substance. The pH of the muddy substance is measured by inserting the electrode of a glass electrode pH meter into the substance in accordance with JIS Z 8802 (pH measurement method). In this case, since the measurement value sometimes depends upon the position where the electrode is inserted, the position of the electrode is changed by moving the beaker, and the pH value is measured while making sure that the electrode surface is in sufficient contact with the mud surface. When the pH value becomes constant, the value is read.

In addition, when the ink of the present invention is prepared for printing by using carbon black having a volatile content within the range of 3.5 to 8% by weight, preferably 4.5 to 6.0% by weight, the density of the print obtained is equivalent to or higher than that of the print obtained by using a dye ink.

The cause for the increase in density of the print obtained by ink jet recording using the ink containing the carbon black having a volatile content of 3.5% by weight or more is not yet defined. However, it is postulated that, because the affinity of the pigment particles for the ink solvent is increased due to the presence of many acid groups on the particle surfaces of such carbon black, micro-dispersion becomes possible, and the print density is consequently increased.

Further, in an ink jet recording method in which ink droplets are discharged as shown by applying heat energy to the ink, it is preferable to use carbon black containing a volatile component within the range of 3.5 to 8% by weight because the chance of a printing failure is easily increased when ink is formed by using carbon black containing over 8% by weight of volatile component and discharged by an ink jet recording device.

The cause for the increase in printing failure may be that droplets are produced on a heater if excessive volatile component is contained in the carbon black.

The value of volatile content of the carbon black in the present invention is obtained by the measurement method below.

A dry carbon black sample is charged in a platinum crucible with a cover or a porcelain crucible, which has the same shape and the same volume as those of the platinum crucible, to a level 2 mm below the cover under shaking. The mass of the sample is then measured. The crucible is covered and then placed in an electric oven. After heating at 950°±25° C. for 7 minutes precisely, the crucible is discharged from the oven and then allowed to cool down to room temperature in a desiccator. The mass of the sample, which has been heated, is then measured, and the volatile content is calculated by the following equation:

$$V = \frac{W_D - W_R}{W_D} \times 100$$

wherein

V: volatile content (%)

$W_D$: mass of dry sample (g)

$W_R$: mass of sample after heating (g)

Examples of such acid carbon black, that can be used in the present invention, include MA7, MA8, #2200B and #2400B (manufactured by Mitsubishi Chemical Industry), RAVEN1040, 1255, 5250, 3500 (manufactured by Colombia Co., Ltd.), REGAL400R and MOGUL L (manufactured by Cabot Co., Ltd.), Color Black FW1, Color Black FW18, Color Black S170, Color Black S150 and Printex U (manufactured by Degussa Co. Ltd.) and the like, all of which are commercially available. Carbon black, which is especially produced for achieving the objects of the present invention, can be also used.

Such acid carbon black is generally produced by a channel black method or a furnace black method. In the channel black method, natural gas, town gas and hydrocarbons, which are used as raw materials, are partially burnt and caused to collide with a cold surface. In the furnace black method, natural gas and a petroleum fraction, which are used as raw materials, are thermally decomposed by spraying in a closed reaction furnace kept at an atmospheric state and at a high temperature.

The carbon black produced is further subjected to acid treatment using nitric acid or the like to obtain a desired acidity.

It is preferable that the quantity of the carbon black used in the present invention is within the range of 3 to 20% by weight.

It is also found that the weight average molecular weight of the water-soluble resin (dispersion resin) which is used for dispersing the carbon black in the present invention, must be within the range of 3,000 to 30,000, preferably 5,000 to 15,000.

Namely, in the ink jet recording device, the ink is discharged from an orifice having a size of 50 $\mu$m or less. When a dispersion system such as pigment ink is used, the viscosity of the dispersion and the size of the dispersed particles significantly affect the discharging characteristics. It is desirable for stable discharging to reduce the viscosity and the size of the dispersed particles as much as possible to ensure a stable stream of ink droplets.

When polymeric dispersion resins in the same amount are respectively dissolved in an aqueous solution, the viscosity of the solutions generally increases as the average molecular weights of the resins increase. In addition, when carbon black is dispersed, such a dispersion resin is adsorbed on the carbon black and has the function of stably dispersing the carbon black due to its steric hindrance. An increase in molecular weight of the dispersion resin thickens the adsorption layer, and the size of the dispersed particles is increased.

Particularly, because acid carbon black, which has many acid groups on the surfaces thereof, repulses the carboxyl groups which are added to the dispersion resin used in the present invention, the particle size of the carbon black has a tendency to further increase.

Namely, when acid carbon black is used, as in the ink of the present invention, discharging stability cannot be obtained unless the viscosity of the ink and the size of the dispersed particles are sufficiently decreased by decreasing the average molecular weight of the dispersion resin. In addition, because the dispersion resin must have the function of producing steric hindrance when being adsorbed on the carbon black, as described above, if the average molecular weight is excessively small, the dispersion stability deteriorates during storage for a long period of time.

Any resin, which is soluble in an aqueous solution and which have weight average molecular weight within the range of 3,000 to 30,000, can be used as the water-soluble resin, which is contained as a dispersant for the carbon black in the ink of the present invention. Examples of such resins include styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers and salts thereof. Although there are various methods of measuring the weight average molecular weight of the dispersion resin, the molecular weight is generally measured by GPC (gel permeation chromatography) or the like. The water-soluble resin is preferably contained in the ink in an amount within the range of 0.1 to 5% by weight relative to the total weight of the ink.

The ink of the present invention is preferably adjusted to neutral or alkaline so that the solubility of the water-soluble resin can be improved, and the long-term preservative property of the ink can be further improved. According to the present invention, the pH value of the ink is preferably within the range of 7 to 10 because the various members used in the ink jet recording device may corrode when the pH of the ink is excessively high.

Examples of pH adjustors include various organic amines such as diethanolamine, triethanolamine and the like, inorganic alkali agents such as alkali metal hydroxides, including sodium hydroxide, lithium hydroxide, potassium hydroxide and the like.

The above-described carbon black and water-soluble resin are dispersed or dissolved in an aqueous liquid medium.

A preferred aqueous liquid medium for the ink of the present invention is a solvent mixture containing water and a water-soluble organic solvent. Ordinary water containing various ions is not used; preferably ion exchange water (deionized water) is used.

Examples of water-soluble organic solvents, that can be used in a mixture with water, include alkyl alcohols having 1 to 4 carbon atoms such as methyl alcohol, n-propyl alcohol, isopropyl alcohol, n-butyl alcohol, sec-butyl alcohol, tert-butyl alcohol, isobutyl alcohol and the like; amides such as dimethylformamide, dimethylacetamide and the like; ketones and ketoalcohols such as acetone, diacetone alcohol and the like; ethers such as tetrahydrofuran, dioxane and the like; polyalkylene glycols such as polyethylene glycol, polypropylene glycol and the like; alkylene glycols each having an alkylene group having 2 to 6 carbon atoms such as ethylene glycol, propylene glycol, butylene glycol, triethylene glycol, 1,2,6-hexanetriol, thiodiglycol, hexylene glycol, diethylene glycol and the like; glycerin; lower alkyl ethers of polyhydroxy alcohols such as ethylene glycol monomethyl (or ethyl) ether, diethylene glycol methyl (or ethyl) ether, triethylene glycol monomethyl (or ethyl) ether and the like; N-methyl-2-pyrrolidone; 1,3-dimethyl-2-imidazolidinone; and the like.

Polyhydroxy alcohols such as diethylene glycol and the like, and lower alkyl ethers of polyhydroxy alcohols such as triethylene glycol monomethyl (or ethyl) ether and the like are preferable.

It was also found that adding at least 3% of ethanol or isopropyl alcohol is effective for obtaining discharging stability. This may be attributed to the addition of an ethanol or isopropyl alcohol solvent which permits further stable foaming of the ink on the thin film resistor. If such an ethanol or isopropyl alcohol solvent is added excessively, however, the quality of the print obtained deteriorated. It is therefore found that the concentration of the ethanol or isopropyl alcohol solvent mutt be within 3 to 10%. The addition of the ethanol or isopropyl alcohol solvent suppresses the occurrence of bubbles during dispersion and thus enables effective dispersion.

The content of the water-soluble organic solvent in the ink generally within the range of 3 to 50% by weight of the total weight of the ink, and the content of the water used is within the range of 10 to 90% by weight of the total weight of the ink.

The ink of the present invention may contain other components such as a surfactant, a defoaming agent, a preservative and the like for the purpose of obtaining the desired physical property as necessary. The ink can also contain a water-soluble dye, which is commercially available.

Examples of surfactants include anionic surfactants such as fatty acid salts, higher alcohol sulfates, liquid fatty oil sulfates, alkyl allyl sulfonates and the like; and nonionic surfactants such as polyoxyethylene alkyl ethers, polyoxyethylene alkyl esters, polyoxyethylene sorbitan alkyl esters and the like. Although the amount of the surfactant used depends upon the kind of the dispersant used, it is preferably between 0.01 to 5% by weight relative to the total weight of the ink.

It is also preferable to determine the amount of the surfactant added so that the surface tension of the ink is at least 30 dyne/cm, because, if the surface tension of the ink is smaller than 30 dyne/cm, undesirable problems occur in the ink jet recording system of the present invention, including, for example, printing distortion due to wetting at the end of the orifice.

The above-mentioned physical properties such as the required values of viscosity, surface tension and pH of the ink are examples of the necessary properties for the ink jet recording medium. Although a dispersion system such as an aqueous pigment ink may have the necessary physical properties, the foaming of the ink may still be unstable, particularly, in an ink jet recording method in which ink droplets are discharged by applying heat energy to the ink.

The inventors therefore energetically investigated the performance of aqueous pigment ink which is thermally stable and which can foam in the optimum state. As a result, the inventors discovered that, if the ink contains carbon black and a water-soluble resin, preferably in a weight ratio within the range of 3:1 to 10:1 (by weight), more preferably 10:3 to 10:1, the ink stably foams on the heater under any driving conditions, and no deposit is produced on the thin film resistor (heater) for a long period of time.

Namely, if the amount of the water-soluble resin contained in the ink is significantly larger than that of the carbon black, the ink either does not foam or the excessive water-soluble resin becomes insoluble and precipitates on the thin film resistor (heater) due to the heat pulse applied to the ink, even if a predetermined quantity of heat energy is applied to the thin film resistor (heater). This causes the occurrence of non-discharging or distortion in printing.

As a result of further investigation on the performance of an ink which can foam in the optimum state, it was found that the amount of the water-soluble resin dissolved in the ink should be 2% by weight or less, preferably 1% by weight or less, of the total weight of the ink.

The water-soluble resin dissolved represents the resin which is adsorbed on the pigment in the ink and which is dissolved in the dispersion medium.

It is also preferable that the total amount of the carbon black and the water-soluble resin in the dispersion is at least 10%, because if the concentration of the carbon black and the water-soluble resin, which are present in the dispersion, is less than the above value, dispersion cannot be effectively made, and the optimum dispersion state cannot be obtained.

The ink of the present invention is produced by the method below.

The carbon black and the resin dispersant are mixed in an aqueous solution which is made alkaline by adding a predetermined amount of amine or base. The resultant mixture is then subjected to dispersion treatment by using the means described below to form a dispersion. The above-described water-soluble solvent and water are added to the dispersion obtained, and the pH of the thus-formed solution is adjusted to 7 or more by using any one of the above-described pH adjustors to form the ink. A water-soluble solvent, a defoaming agent and the like may be added to the thus-formed dispersion, if necessary, or the dispersion itself may be used as an ink. Further, the ink may be subjected to centrifugal separation, if necessary.

In order to make the amount of the resin, which is not adsorbed, 2% or less, in the above production method, it is necessary to agitate the solution containing the resin, an amine or base and water at 60° C. or higher for at least 30 minutes so as to completely dissolve the resin.

It is necessary that the amount of the amine or base added for dissolving the resin is at least 1.2 times the amount of the amine or base which is determined by calculations based on the acid value of the resin. This amount of the amine or base is determined by the following equation:

$$\left(\begin{array}{c}\text{Amount of}\\ \text{amine or base (g)}\end{array}\right) = \frac{\left(\begin{array}{c}\text{Acid value}\\ \text{of resin}\end{array}\right) \times \left(\begin{array}{c}\text{Molecular weight}\\ \text{of amine or base}\end{array}\right) \times \left(\begin{array}{c}\text{Amount of}\\ \text{resin (g)}\end{array}\right)}{56000}$$

It is also necessary to perform pre-mixing for at least 30 minutes before the aqueous solution containing the pigment is subjected to dispersion treatment.

This pre-mixing operation has the function of improving the wettability of the pigment surfaces and promoting the adsorption of the resin on the pigment surfaces.

An organic amine such as monoethanolamine, diethanolamine, triethanolamine, aminomethyl propanol, ammonia or the like is preferably used as the amine added to the dispersion.

An inorganic alkali agent such as an alkali metal hydroxide such as sodium hydroxide, potassium hydroxide, lithium hydroxide or the like is preferably used as the base added to the dispersion.

Any one of the dispersing machines of the type that is generally used may be used in the present invention, for example, a ball mill, a roll mill or a sand mill may be used.

Of these dispersing machines, a high-speed sand mill is preferable. Examples of such sand mills include Super Mill, Sand Grinder, Bead Mill, Agitator Mill, Grain Mill, Dino Mill, Pearl Mill, Cobol Mill (all of which are trade names) and the like.

In the present invention, a pigment which has a desired particle size distribution is obtained by the method steps of reducing the size of the grinding medium of a dispersing machine, increasing the packing rate of the grinding medium, increasing the treatment time, decreasing the discharging speed, or classifying the particles by using a filter or a centrifugal separator or the like after grinding. Combination of the methods may be used in the present invention.

In the present invention, the amount of the resin not adsorbed is preferably measured by a method in which the pigment and the portion of the resin adsorbed on the pigment are deposited by using an ultracentrifuge, and the amount of the remaining resin contained in the supernatant is measured by a TOC (Total Organic Carbon) method, a weight method (in which the supernatant is evaporated to dryness, and the weight of the remaining resin is measured) or the like.

The ink of the present invention is preferably used in the ink jet recording method in which ink droplets are discharged by employing thermal energy. However, the ink can also be used for general writing utensils.

An example of the recording apparatus which are preferable for recording by using the ink of the present invention is an apparatus in which ink droplets are produced by applying heat energy to the ink in the chamber of a recording head in correspondence with a recording signal.

Figure 1B:
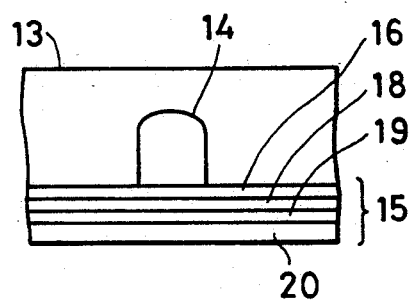
Figure 2:
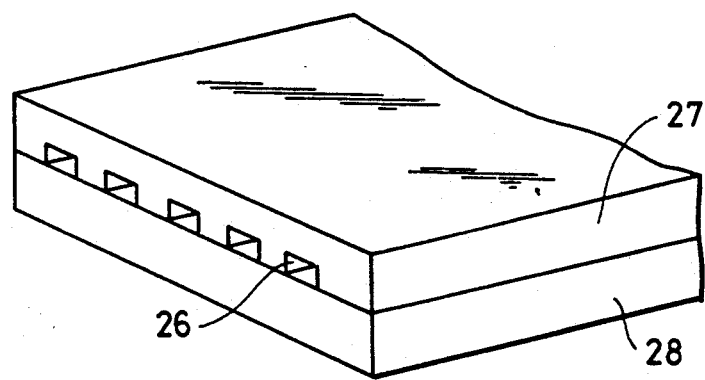
FIG. 2 is a perspective view of a multiple head which comprises the head shown in FIG. 1.

FIGS. 1(a), 1(b) and 2 show examples of the structure of a head, which is a principal part of an ink jet recording apparatus.

In the drawings, a head 13 is formed by bonding a glass, ceramic or plastic plate, which has a groove 14 for allowing ink to pass therethrough, and a heating head 15 used for heat-sensitive recording. (Although a thin film head is shown in the drawings, the head is not limited to such embodiment.) The heating head 15 comprises a protective film 16 made of silicon oxide or the like, aluminum electrodes 17-1, 17-2, a heating resistor layer 18 made of nichrome or the like, a heat-accumulating layer 19 and a substrate 20 made of aluminum or the like and having good heat radiation properties.

Ink 21 reaches a discharging orifice (micropore) 22 and forms a meniscus 23 at pressure P.

When an electrical signal is applied to the electrodes 17-1, 17-2, a region off the heating head 15, which is denoted by n, rapidly generates heat so as to generate air bubbles in the ink 21 which contacts with the region. The meniscus 23 is projected by the pressure generated, and the ink 21 is ejected or discharged as a stream or jet of ink droplets 24 from the orifice 22. The droplets 24 are propelled toward a recording material 25. FIG. 2 shows a multiple head (multi-head) comprising a plurality of the heads shown in FIG. 1(a) which are arranged in parallel. The multi-head is formed by bonding a glass plate 27 having a plurality of grooves 26 and a heating head 28, which is the same as that shown in FIG. 1(a).

FIG. 1(a) is a sectional view taken along the ink flow channel of the ink, and FIG. 1(b) is a sectional view taken along the line A—B in FIG. 1(a).

Figure 3:
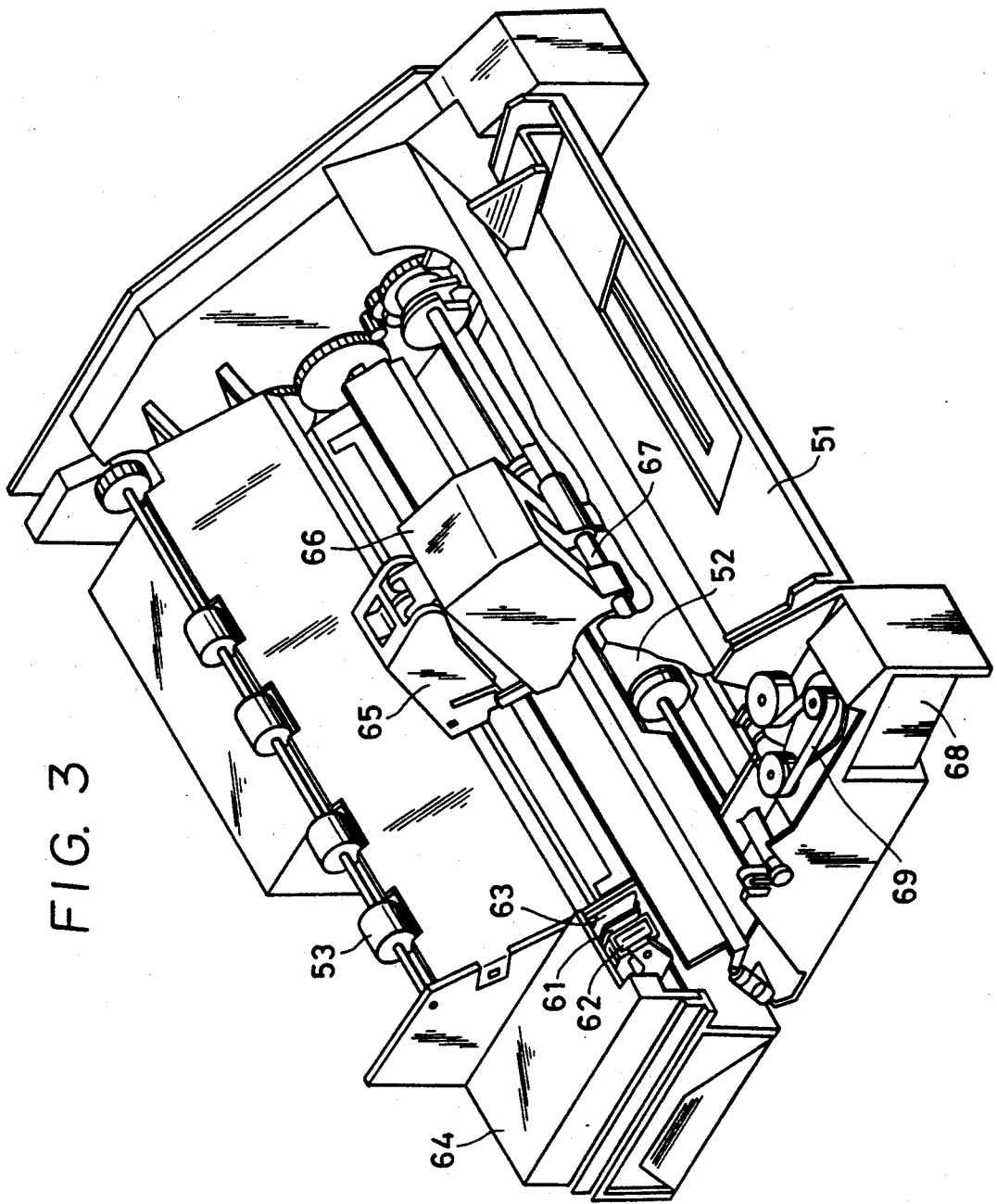
FIG. 3 is a perspective view of an example of an ink jet recording apparatus.

FIG. 3 shows an example of an ink jet recording apparatus in which the head shown in FIG. 1 is incorporated.

In FIG. 3, reference numeral 61 denotes a blade serving as a wiping member in the form of a cantilever in which one end is a fixed end held by a blade holding member. The blade 61 is disposed at a position adjacent to a region of recording by a recording head. In this example, the blade 61 is held in a portion in which it projects in the path of the movement of the recording head. Reference numeral 62 denotes a cap which is disposed at a home position adjacent to the blade 61 and which is moved in the direction vertical to the moving direction of the recording head so as to contact with the nozzle surface for the purpose of capping. Reference numeral 63 denotes an ink absorber which is disposed at a position adjacent to the blade 61 and which is held in a portion in which it projects in the path of the movement of the recording head in the same way as the blade 61. The blade 61, the cap 62 and the absorber 63 form a discharging recovery part 64. Moisture and dust on the ink orifice surface are removed by the blade 61 and the absorber 63.

Reference numeral 65 denotes the ink jet device which has a means for generating discharging energy so as to record an image by discharging the ink to the recording material opposite to the orifice surface having orifices. Reference numeral 66 denotes a carriage for moving the ink-jet device 65 which is loaded thereon. The carriage 66 is slidably engaged with a guide shaft 67 and is partially connected (not shown) to a belt 69 which is driven by a motor 68. This permits the carriage 66 to move along the guide shaft 67 and move in the region of recording by the ink-jet device 65 and the region adjacent thereto.

Reference numeral 51 denotes a sheet feeding part, and reference numeral 52 denotes a sheet feeding roller which is driven by a motor (not shown). This arrangement allows the recording paper to be fed to a position opposite to the orifice surface of the recording head and to be delivered to a take-off part having a take-off roller 53 during the progress of recording.

In the aforementioned arrangement, when the recording head 65 is returned to the home position at the end of recording, the cap 62 is retracted from the path of movement of the ink-jet device 65, while the blade 61 is projected in the path of movement. As a result, the nozzle surface of the ink-jet device 65 is wiped by the blade 61. When the cap 62 contacts with the nozzle surface of the ink-jet device 65 so as to cap it, the cap 62 is moved so as to project in the path of movement of the ink-jet device 65.

When the ink-jet device head 65 is moved from the home position to the recording start position, the cap 62 and the blade 61 are at the same positions as the above-described positions in wiping. As a result, the nozzle surface of the ink-jet device 65 is wiped even during the movement of the ink-jet device 65.

The ink-jet device 65 is moved to the home position adjacent to the recording region not only at the end of recording and during the recovery of discharging, but also at predetermined intervals when it is moved in the recording region for the purpose of recording. This movement causes the above-described wiping.

Figure 4:
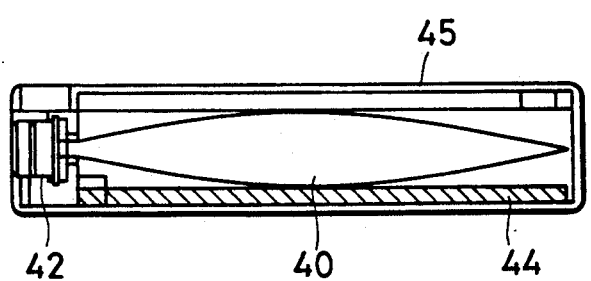
FIG. 4 is a longitudinal sectional view of an ink cartridge.

FIG. 4 is a drawing which shows an example of an ink cartridge 45 for containing the ink to be supplied to the head through an ink supply tube. In the drawing, reference numeral 40 denotes an ink bag for containing the ink to be supplied which has a rubber stopper 42 at its one end. When a needle (not shown) is inserted into the stopper 42, the ink contained in the ink bag 40 can be supplied to the ink-jet device 65. Reference numeral 44 denotes an ink absorber for absorbing waste ink.

The ink jet recording apparatus used in the present invention is not limited to an apparatus in which a device and an ink cartridge are separately disposed, as described above. The ink-jet device shown in FIG. 5 in which a device and an ink cartridge are integrated can be preferably used in the present invention.

Figure 5:
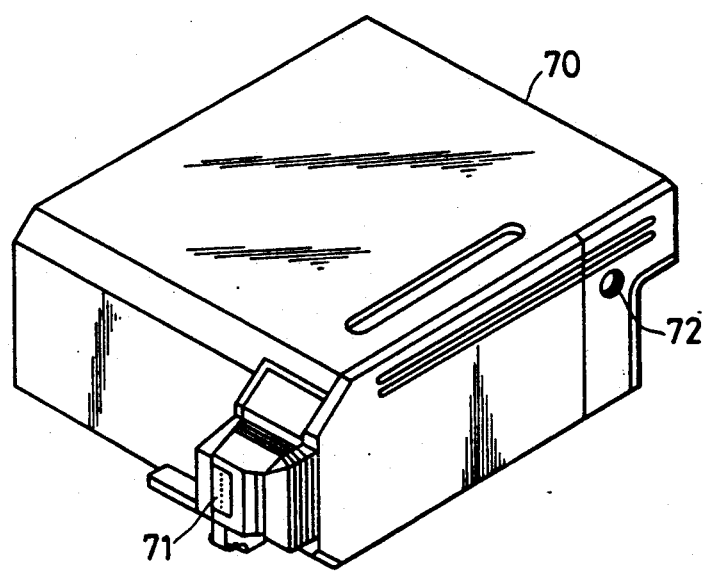
FIG. 5 is a perspective view of an ink jet device.

In FIG. 5, reference numeral 70 denotes an ink jet device which contains an ink storing member impregnated with ink. The ink in the ink storing member is discharged as ink droplets from a head part 71 having a plurality of orifices.

Reference numeral 72 denotes a communicating hole for allowing the inside of the device 70 to communicate with the atmosphere.

The ink jet device 70 is used in place of the ink-jet device 65 shown in FIG. 3 and is detachably provided on the carriage 66.

As described above, the ink of the present invention not only produces a print having good fastness and high density on plain paper, particularly wood free paper, but also permits constant stable ejection even if driving conditions vary or if the ink has been used for a long time even under high temperature. The ink also exhibits improved long-term preservative stability.

The present invention is described below with reference to examples.

EXAMPLE 1

| Formation of pigment dispersion | |
| --- | --- |
| Styrene-acrylic acid-butyl acrylate copolymer (acid value 60, weight average molecular weight 13,000) | 3 parts |
| Monoethanolamine | 2 parts |
| Ion exchange water | 71 parts |
| Diethylene glycol | 5 parts |

The above components were mixed and then heated to 70° C. in a water bath for the purpose of completely dissolving the resin component. 14 parts of carbon black (Color Black S170 manufactured by Degussa Co., Ltd.) and 5 parts of isopropyl alcohol were added to the thus-formed solution. The resultant mixture was then subjected to pre-mixing for 30 minutes and then to dispersion treatment under the conditions below.

Dispersing machine: Sand Grinder (manufactured by Igarashi Kikai)
Grinding medium: zirconium beads having a diameter of 1 mm
Packing rate of grinding medium: 50% by volume
Grinding time: 3 hours The mixture was further subjected to centrifugal separation (12,000 rpm, 20 minutes) for removing coarse particles to form a dispersion.

| Formation of ink | |
| --- | --- |
| The above dispersion | 30 parts |
| Diethylene glycol | 20 parts |
| Isopropyl alcohol | 5 parts |
| Ion exchange water | 45 parts |

The above-described components were mixed, and the pH of the resultant mixture was then adjusted to at least 7 by using monoethanolamine to form an ink (A). The ink contained a pigment and a resin at a ratio by weight of 14:3.

EXAMPLE 2

| Formation of pigment dispersion | |
| --- | --- |
| Styrene-maleic half ester-maleic anhydride copolymer (acid value 188, weight average molecular weight 15,000) | 6 parts |
| Triethanolamine | 4 parts |
| Ion exchange water | 58 parts |
| Diethylene glycol | 5 parts |

The above components were mixed and then heated to 70° C. in a water bath for the purpose of completely dissolving the resin component. 20 parts of carbon black (RAVEN 3500 manufactured by Columbia Co.) and 7 parts of ethanol were added to the thus-formed solution. The resultant mixture was then subjected to pre-mixing for 30 minutes and then to dispersion treatment under the conditions below.

Dispersing machine: Pearl Mill (manufactured by Ashizawa)
Grinding medium: glass beads having a diameter of 1 mm
Packing rate of grinding medium: 50% by volume
Discharging speed: 100 ml/min The mixture was further subjected to centrifugal separation (12000 rpm, 20 minutes) for removing coarse particles to form a dispersion.

| Formation of ink | |
| --- | --- |
| The above dispersion | 30 parts |
| Diethylene glycol | 15 parts |
| Ethylene glycol | 5 parts |
| Ethanol | 5 parts |
| Ion exchange water | 45 parts |

The above-described components were mixed, and the pH of the resultant mixture was then adjusted to at least 7 by using triethanolamine to form an ink (B). The ink contained a pigment and a resin at a ratio by weight of 10:3.

EXAMPLE 3

| Formation of pigment dispersion | |
| --- | --- |
| Styrene-acrylic acid-butyl acrylate copolymer (acid value 80, weight average molecular weight 6700) | 5 parts |
| Aminomethyl propanol | 2 parts |
| Ion exchange water | 61 parts |
| Diethylene glycol | 5 parts |

The above components were mixed and then heated to 70° C. in a water bath for the purpose of completely dissolving the resin component. 20 parts of carbon black (COLOR BLACK FW1 manufactured by Degussa) and 7 parts of ethanol were added to the thus-formed solution. The resultant mixture was then subjected to pre-mixing for 30 minutes and then to dispersion treatment under the conditions below.

Dispersing machine: Pearl Mill (manufactured by Ashizawa)
Grinding medium: glass beads having a diameter of 1 mm
Packing rate of grinding medium: 50% by volume
Discharging speed: 100 ml/min The mixture was further subjected to centrifugal separation (12,000 rpm, 20 minutes) for removing coarse particles to form a dispersion.

| Formation of ink | |
|---|---|
| The above dispersion | 50 parts |
| Glycerin | 15 parts |
| Ethylene glycol | 5 parts |
| Ethanol | 5 parts |
| Ion exchange water | 25 parts |

The above-described components were mixed, and the pH of the resultant mixture was then adjusted to at least 7 by using aminomethyl propanol to form an ink (C). The ink contained a pigment and a resin at a ratio by weight of 4:1.

EXAMPLE 4

| Formation of pigment dispersion | | |
|---|---|---|
| Styrene maleic half ester-maleic anhydride copolymer (acid value 188, weight average molecular weight 15,000) | 5 | parts |
| Triethanolamine | 3 | parts |
| Ion exchange water | 67 | parts |
| Ethylene glycol | 5 | parts |

The above components were mixed and then heated to 70° C. in a water bath for the purpose of completely dissolving the resin component. 15 parts of carbon black (MOGUL L manufactured by Cabot) and 5 parts of ethanol were added to the thus-formed solution. The resultant mixture was then subjected to pre-mixing for 30 minutes and then to dispersion treatment under the conditions below.

Dispersing machine: Sand Grinder (manufactured by Igarashi Kikai K. K.)
Grinding medium: zirconium beads having a diameter of 1 mm
Packing rate of grinding medium: 50% by volume
Grinding time: 3 hours The mixture was further subjected to centrifugal separation (12000 rpm, 20 minutes) for removing coarse particles to form a dispersion.

| Formation of ink | |
|---|---|
| The above dispersion | 35 parts |
| Thiodiglycol | 15 parts |
| Ethylene glycol | 5 parts |
| Ethanol | 4 parts |
| Ion exchange water | 41 parts |

The above-described components were mixed, and the pH of the resultant mixture was then adjusted to at least 7 by using monoethanolamine, followed by agitation for 1 hour, to form an ink (D). The ink contained a pigment and a resin at a ratio by weight of 3:1.

EXAMPLE 5

Ink (E) was obtained by the same method as that employed in Example 1 with the exception that the carbon black contained in the dispersion of Example 1 was replaced by Carbon Black (RAVEN 5250 manufactured by Columbia Co.). The ink contained a pigment and a resin at a ratio by weight of 14:3.

COMPARATIVE EXAMPLE 1

Ink (F) was obtained by the same method as that employed in Example 1 with the exception that the carbon black contained in the dispersion of Example 1 was replaced by carbon black REGAL 660R (manufactured by Cabot). The ink contained a pigment and a resin at a ratio by weight of 14:3.

COMPARATIVE EXAMPLE 2

Ink (G) was obtained by the same method as that employed in Example 1 with the exception that 14 parts of styrene-acrylic acid-butyl acrylate copolymer, 9.3 parts of monoethanol amine and 52.7 parts of ion exchange water and 5 parts of diethylene glycol were mixed to form a dispersion. The ink contained a pigment and a resin at a ratio by weight of 1:1.

COMPARATIVE EXAMPLE 3

Ink (H) was obtained by the same method as that employed in Example 3 with the exception that the water-soluble resin contained in the dispersion of Example 3 was replaced by a styrene-acrylic acid-butyl acrylate copolymer (acid value 115, weight average molecular weight 2800) The ink contained a pigment and a resin at a ratio by weight of 4:1.

COMPARATIVE EXAMPLE 4

Ink (I) was obtained by the same method as that employed in Example 2 with the exception that the carbon black contained in the dispersion of Example 2 was replaced by carbon black (Special Black 6 manufactured by Degussa). The ink contained a pigment and a resin at a ratio by weight of 10:3.

COMPARATIVE EXAMPLE 5

Ink (J) was obtained by the same method as that employed in Example 4 with the exception that the carbon black contained in the dispersion of Example 4 was replaced by carbon black (RAVEN1040 manufactured by Columbia). The ink contained a pigment and a resin at a ratio by weight of 3:1.

COMPARATIVE EXAMPLE 6

Ink (K) was obtained by the same method as that employed in Example 1 with the exception that the carbon black contained in the dispersion of Example 1 was replaced by carbon black #2400B (manufactured by Mitsubishi Chemical Industry). The ink contained a pigment and a resin at a ratio by weight of 14:3.

COMPARATIVE EXAMPLE 7

Ink (L) was obtained by the same method as that employed in Example 1 with the exception that the pigment dispersion was replaced by 1 part of styrene-acrylic acid-butyl acrylate copolymer, 1 part of monoethanolamine and 74 parts of ion-exchange water, and 5 parts of diethylene glycol. The ink contained a pigment and a resin at a ratio by weight of 14:1.

The tests below were made by using each of the inks (A) to (L) and an ink jet recording device (BJ-130 manufactured by Canon Co., Ltd.) having an on-demand multi-recording head provided with a heating element. The results are shown in Table 2.

T1: Driving Conditions and Discharging Stability Test

Printing was made at room temperature and combinations of driving voltages of 25 V and 30 V and frequencies of 2 KHz and 4 KHz. The discharging stability was evaluated by observing the disturbance and defect in printing and non-discharging on the basis of the following criteria:

A: Printing was cleanly made from the first letter, without producing non-discharging, defect and disturbance in printing.

B Letter portions were cleanly printed, while non-discharging occurred at several positions in full black-out portions (solid-printed portions).

C: Non-discharging occurred even in letter portions after several letters had been printed, producing disturbance in printing which made the letters printed impossible to read.

T2: Optical Density Test of the Print

The density of the print (obtained on NP-DK paper (woodfree paper) by using a printer BJ130 manufactured by Canon Co., Ltd.) was measured by using a Macbeth densitometer (RD918).

T3: Long-Term Preservation Test of the Ink

After each of the inks had been stored at 40° C. for 4 weeks, the weight of the deposit adhering to the bottom of a storing bottle was measured with the eye on the basis of the following criteria:

A: No deposit was observed.

B: Slight deposit was observed at the bottom of the bottle to an extent which produced no problem.

C: Large quantities of deposit were produced.

T4: Long-Term Ejection Stability Test

Continuous printing was made for 100 hours at 35° C., driving voltage of 30 V, frequency of 4 kHz.

The ejection stability was evaluated by observing the disturbance and defect in printing and non-ejecting on the basis of the following criteria:

O: Printing was made without producing non-ejecting defect and disturbance in printing.

X: Before 100 hours had passed disturbance in printing occurred and some of the nozzles failed to eject ink.

T0: Measurement of the Concentration of the Remaining Resin

The pigment and the resin adsorbed on the pigment in each of the ink products obtained were deposited by centrifugal separation at 55000 rpm using an ultra-high speed cooling centrifuge (manufactured by Beckmann Co., Ltd.). A predetermined quantity of supernatant was then solidified to dryness (60° C., 24 hours). The percentage by weight of the remaining resin relative to the charged ink was calculated to obtain a concentration of the remaining resin.

Table 1 shows the properties of each of the carbon black samples used in the present invention, and Table 2 shows the results of the evaluation made in the invention.

TABLE 1

| Carbon black name | Properties of Carbon Black | | | | |
| --- | --- | --- | --- | --- | --- |
| | Particle size (nm) | Specific surface area ($m^2/g$) | DBP Oil absorption value (ml/100 g) | Volatile content (wt %) | pH |
| Color Black S170 | 17 | 200 | 150 | 4.5 | 4.0 |
| RAVEN 3500 | 16 | 375 | 105 | 5.3 | 2.5 |
| Color Black FW1 | 13 | 320 | 170 | 6.0 | 4.0 |
| MOGUL L | 24 | 138 | 60 | 5.0 | 3.4 |
| RAVEN 5250 | 20 | 525 | 98 | 8.0 | 2.2 |
| REGAL 660R | 24 | 112 | 65 | 1.0 | 7.5 |
| Special Black 6 | 17 | 300 | 160 | 18.0 | 0.5 |
| RAVEN 1040 | 26 | 120 | 60 | 3.0 | 5.5 |
| #2400B | 15 | 260 | 45 | 10.0 | 2.0 |

TABLE 2

| Example | Ink | Name of Carbon Black used | Weight Average Molecular Weight of the Resin | Pigment to Resin Weight Ratio | pH of Ink | T1 | | | | T2 | T3 | T0 (%) | T4 |
| --- | --- | --- | --- | --- | --- | --- | --- | --- | --- | --- | --- | --- | --- |
| | | | | | | 2 KHz 25 V | 2 KHz 30 V | 4 KHz 25 V | 4 KHz 30 V | | | | |
| Example 1 | (A) | Color Black S170 | 13,000 | 14:3 | 8.30 | A | A | A | A | 1.49 | B | 0.21 | O |
| Example 2 | (B) | RAVEN 3500 | 15,000 | 10:3 | 8.20 | A | A | A | A | 1.39 | B | 0.15 | O |
| Example 3 | (C) | Carbon Black FW1 | 6,700 | 4:1 | 7.70 | A | A | A | A | 1.25 | B | 0.31 | O |
| Example 4 | (D) | Mogul L | 15,000 | 3:1 | 7.80 | A | A | A | A | 1.35 | B | 0.17 | O |
| Example 5 | (E) | RAVEN 5250 | 13,000 | 14:3 | 8.25 | A | A | A | A | 1.11 | B | 0.18 | O |
| Comp. Example 1 | (F) | Regal 660R | 13,000 | 14:3 | 8.90 | A | A | A | A | 0.96 | B | 0.25 | O |
| Comp. Example 2 | (G) | Color Black S170 | 13,000 | 1:1 | 8.20 | C | C | C | C | * | B | 2.3 | X |
| Comp. Example 3 | (H) | Carbon Black FW1 | 2,800 | 4:1 | 7.80 | A | A | B | A | 1.23 | C | 0.33 | X |
| Comp. Example 4 | (I) | Special Black 6 | 15,000 | 10:3 | 7.70 | A | A | B | A | 1.20 | B | 0.23 | X |
| Comp. | (J) | RAVEN | 15,000 | 3:1 | 8.10 | A | A | A | A | 0.95 | B | 0.11 | O |

TABLE 2-continued

| Example | Ink | Name of Carbon Black used | Weight Average Molecular Weight of the Resin | Pigment to Resin Weight Ratio | pH of Ink | T1 2 KHz 25 V | T1 2 KHz 30 V | T1 4 KHz 25 V | T1 4 KHz 30 V | T2 | T3 | T0 (%) | T4 |
|---|---|---|---|---|---|---|---|---|---|---|---|---|---|
| Example 5 Comp. Example 6 | (K) | 1040 #2400 B | 13,000 | 14:3 | 7.50 | A | A | B | A | 1.28 | B | 0.26 | X |
| Comp. Example 7 | (L) | Color Black S170 | 13,000 | 14:1 | 8.70 | A | B | B | B | 1.38 | C | 0.31 | X |

*immeasurable

What is claimed is:

1. An ink comprising an aqueous liquid medium which contains acid carbon black having a volatile content within the range of 3.5 to 8% by weight of the total weight of the carbon black and a water-soluble resin having a weight average molecular weight within the range of 3,000 to 30,000, wherein the weight ratio of said acid carbon black to said water-soluble resin is within the range of 3:1 to 10:1.

2. An ink according to claim 1, wherein the pH of said acid carbon black is 5 or less.

3. An ink according to claim 1, wherein the weight average molecular weight of said water-soluble resin is within the range of 5,000 to 15,000.

4. An ink according to claim 1, wherein the weight ratio of said carbon black to said water-soluble resin is within the range of 10:3 to 10:1.

5. An ink according to claim 1, wherein said aqueous liquid medium comprises a mixture of water and a water-soluble organic solvent.

6. An ink according to claim 5, wherein said water-soluble organic solvent is selected from at least one of polyhydroxy alcohols and aliphatic monohydroxy alcohols.

7. An ink according to claim 1, wherein the volatile content of the said acid carbon black is within the range of 4.5 to 6% by weight.

8. An ink comprising an aqueous liquid medium which contains acid carbon black having a volatile content within the range of 3.5 to 8% by weight and a water-soluble resin having a weight average molecular weight within the range of 3000 to 30000, wherein the weight ratio of said acid carbon black to said water-soluble resin is within the range of 3:1 to 10:1, and the amount of said water-soluble resin dissolved in said medium is 2% by weight of the total weight of said medium or less.

9. An ink according to claim 8, wherein the amount of said water-soluble resin dissolved in said medium is 1% by weight of the total weight of said medium or less.

10. An ink according to claim 8, wherein pH of said acid carbon black is 5 or less.

11. An ink according to claim 8, wherein the weight ratio of said acid carbon black to said water-soluble resin is within the range of 10:3 to 10:1.

12. An ink according to claim 8, wherein the weight average molecular weight of said water-soluble resin is within the range of 5,000 to 15,000.

13. An ink according to claim 8, wherein said aqueous liquid medium comprises a mixture of water and a water-soluble organic solvent.

14. An ink according to claim 13, wherein said water-soluble organic solvent is selected from at least one of polyhydroxy alcohols and aliphatic monohydroxy alcohols.

15. An ink according to claim 8, wherein the volatile content of said acid carbon black is within the range of 4.5 to 6% by weight.

16. An ink according to any one of claims 1 to 8 having a pH of at least 7.

17. An ink jet recording method comprising the step of:

applying to a recording material ink droplets that are discharged from orifices of an ink jet recording head by applying to said ink heat energy that corresponds to a recording signal, wherein said ink comprises an aqueous medium containing acid carbon black having a volatile content within the range of 3.5 to 8% by weight of the total weight of the carbon black and a water-soluble resin having a weight average molecular weight within the range of 3,000 to 30,000, wherein the weight ratio of said acid carbon black to said water-soluble resin is within the range of 3:1 to 10:1, and wherein said step is performed on-demand.

18. An ink jet recording method according to claim 17, wherein pH of said acid carbon black is 5 or less.

19. An ink jet recording method according to claim 17, wherein the weight ratio of said acid carbon black to said water-soluble resin is within the range of 10:3 to 10:1.

20. An ink jet recording method according to claim 17, wherein the amount of said water-soluble resin dissolved in said ink is 2% by weight or less based on the total weight of said ink.

21. An ink jet recording method according to claim 17, wherein the amount of said water-soluble resin dissolved in said ink is 1% by weight or less based on the total weight of said ink.

22. An ink jet recording method according to claim 17, wherein said recording material is plain paper.

23. An ink jet recording method according to claim 17, wherein said recording material is woodfree paper.

24. An ink jet recording method according to claim 17, including employing an ink having a pH of at least 7.

25. An ink jet device comprising an ink storing member impregnated with an ink which contains an aqueous liquid medium which contains acid carbon black having a volatile content within the range of 3.5 to 8% by weight of the total weight of the carbon black and a water-soluble resin having a weight average molecular weight within the range of 3,000 to 30,000, wherein the weight ratio of acid carbon black to said water-soluble resin is within the range of 3:1 to 10:1, and a head has a plurality of orifices for discharging said ink as ink droplets.

26. An ink jet recording apparatus comprising an ink jet device, which comprises an ink storing member impregnated with an ink containing an aqueous liquid medium which contains acid carbon black having a volatile content within the range of 3.5 to 8% by weight of the total weight of the carbon black and a water-soluble resin having a weight average molecular weight within the range of 3,000 to 30,000, wherein the weight ratio of said acid carbon black to said water-soluble resin is within the range of 3:1 to 10:1, and a head has a plurality of orifices for discharging said ink as ink droplets.

27. An ink jet device according to claim 25, wherein said ink storing member is an ink absorber or an ink bag.

28. An ink jet device according to claim 25, wherein said head has a heating head to provide ink a heat energy for ejecting ink droplets.

29. An ink jet recording apparatus according to claim 26, wherein said ink storing member is an ink absorber or an ink bag.

30. An ink jet recording apparatus according to claim 26, wherein said head has a heating head to provide ink a heat energy for ejecting ink droplets.

31. An ink jet cartridge comprising an ink bag impregnated with an ink containing an aqueous liquid medium which contains acid carbon black having a volatile content within the range of 3.5 to 8% by weight of the total weight of the carbon black and a water-soluble resin having a weight average molecular weight within the range of 3,000 to 30,000, wherein the weight ratio of said acid carbon black to said water-soluble resin is within the range of 3:1 to 10:1.

* * * * *

UNITED STATES PATENT AND TRADEMARK OFFICE
CERTIFICATE OF CORRECTION

PATENT NO. : 5,184,148
DATED : February 2, 1993
INVENTOR(S) : Suga et al.

It is certified that error appears in the above-identified patent and that said Letters Patent is hereby corrected as shown below:

COLUMN 2:

Line 17, "stability" should read --stability is--.

COLUMN 7:

Line 10, "mutt" should read --must--.

COLUMN 14:

Line 35, "2800)" should read --2800).--.

COLUMN 18:

Line 16, "8" should read --8,--.

Signed and Sealed this

Twenty-eighth Day of December, 1993

Attest:

BRUCE LEHMAN

Attesting Officer

Commissioner of Patents and Trademarks